US012628852B2

(12) United States Patent
Sato et al.

(10) Patent No.: US 12,628,852 B2
(45) Date of Patent: May 19, 2026

(54) MEAT-LIKE PROCESSED FOOD PRODUCT AND METHOD FOR MANUFACTURING THE SAME

(71) Applicant: FUJI OIL CO., LTD., Osaka (JP)

(72) Inventors: Tomonori Sato, Ibaraki (JP); Hiroko Yonemoto, Ibaraki (JP)

(73) Assignee: FUJI OIL CO., LTD., Osaka (JP)

( * ) Notice: Subject to any disclaimer, the term of this patent is extended or adjusted under 35 U.S.C. 154(b) by 347 days.

(21) Appl. No.: 18/265,261

(22) PCT Filed: Dec. 14, 2021

(86) PCT No.: PCT/JP2021/045954

§ 371 (c)(1),
(2) Date: Jun. 5, 2023

(87) PCT Pub. No.: WO2022/138308

PCT Pub. Date: Jun. 30, 2022

(65) Prior Publication Data

US 2024/0032573 A1     Feb. 1, 2024

(30) Foreign Application Priority Data

Dec. 22, 2020     (JP) ................................. 2020-211909

(51) Int. Cl.
*A23L 13/40*     (2023.01)
*A23L 13/60*     (2016.01)

(52) U.S. Cl.
CPC ............. *A23L 13/426* (2016.08); *A23L 13/60* (2016.08)

(58) Field of Classification Search
CPC .. A23J 3/00; A23L 13/40; A23L 13/60; A23L 13/426
USPC ....................................................... 426/615
See application file for complete search history.

(56) References Cited

U.S. PATENT DOCUMENTS

2017/0105438 A1     4/2017   Ajami et al.

FOREIGN PATENT DOCUMENTS

| | | |
|---|---|---|
| JP | 2005021163 | 1/2005 |
| JP | 2018029565 | 3/2018 |
| JP | 2018533945 | 11/2018 |
| JP | 2019110898 | 7/2019 |
| WO | 2016093296 | 6/2016 |

OTHER PUBLICATIONS

"International Search Report (Form PCT/ISA/210) of PCT/JP2021/045954", mailed on Feb. 22, 2022, with English translation thereof, pp. 1-4.
Fiberstar, "Texturized Citrus Fiber for Meat Alternatives Citri-Fi(R) TX", Retrieved on Feb. 8, 2022, Available at: https://www.jmswank.com/wp-content/uploads/2020/04/citri-fi-tx-texturizing-citrus-fiber-sales-sheet.pdf.

*Primary Examiner* — Subbalakshmi Prakash
(74) *Attorney, Agent, or Firm* — JCIPRNET

(57)     ABSTRACT

The present invention provides a meat-like processed food product including a textured vegetable material as a substitute for meat, the meat-like processed food product comprising a dough prepared from an oil-in-water emulsion gel containing methyl cellulose, ensuring high yield during heating, and having a good meat-like texture. In this invention, a meat-like processed food product free of animal raw materials can be manufactured by the steps of: (A) preparing an oil-in-water emulsion containing at least an oil/fat, methyl cellulose, and water; (B) preparing a dough by mixing the emulsion prepared in (A) with a textured vegetable material, insoluble dietary fiber, and citrus fiber; and (C) forming and then heating the dough prepared in (B) into a meat-like processed food product. The insoluble dietary fiber preferably has an average fiber length of 20-300 μm, and is further preferably bamboo fiber.

11 Claims, No Drawings

MEAT-LIKE PROCESSED FOOD PRODUCT AND METHOD FOR MANUFACTURING THE SAME

CROSS-REFERENCE TO RELATED APPLICATION

This application is a 371 application of the International PCT application serial no. PCT/JP2021/045954, filed on Dec. 14, 2021, which claims the priority benefits of Japan Patent Application No. 2020-211909, filed on Dec. 22, 2020. The entirety of each of the above-mentioned patent applications is hereby incorporated by reference herein and made a part of this specification.

TECHNICAL FIELD

The present invention relates to a meat-like processed food product including a textured vegetable material as a substitute for meat, the meat-like processed food product containing a dough prepared from an oil-in-water emulsion gel containing methyl cellulose, securing a high yield during heating, and having a good meat-like texture.

BACKGROUND ART

The market for vegetable foods, particularly meat-like processed food products such as veggie burgers, is growing significantly both in Japan and overseas. These meat-like processed food products are obtained by processing a textured protein material structured from vegetable proteins such as soybeans as a main raw material using an extruder or the like into a meat form, but dried egg white, which is an animal material, is used in many products and thus complete vegetarians, so-called vegans, cannot eat them.

Methyl cellulose (hereinafter referred to as MC) is frequently used as a substitute material for dried egg white. In Patent Literature 1, methyl cellulose, gluten and the like are used, and in Patent Literature 2, meat-like processed food products having a body of methyl cellulose are produced from emulsion curd using an isolated soybean protein material and methyl cellulose, but they do not exhibit a texture that can substitute for egg white, and there is also water release during heating caused by methyl cellulose, and therefore further improvement is anticipated.

In Patent Literature 3, a meat-like processed food product is produced using a lipogel obtained by combining an oil/fat and insoluble fibers, but hamburgers distributed in Japan have different physical properties, and it is necessary to deter a feeling of prominent meat grain and improve a feeling of dryness.

Citrus fibers are a material that is often used to improve physical properties of wheat flour products such as baked products. Patent Literature 4 describes that, when citrus fibers are added to a pickling liquid for a food product material for fried chicken such as chicken meat, it is possible to improve crispness of a coating, but a combination with a methyl cellulose gel is neither disclosed nor suggested.

CITATION LIST

Patent Literature

[Patent Literature 1]
Japanese Patent Laid-Open No. 2005-21163
[Patent Literature 2]
Japanese Patent Laid-Open No. 2018-29565

[Patent Literature 3]
Published Japanese Translation No. 2018-533945 of the PCT International Publication
[Patent Literature 4]
Japanese Patent Laid-Open No. 2019-110898

SUMMARY OF INVENTION

Technical Problem

An objective of the present invention is to provide a meat-like processed food product including a textured vegetable material as a substitute for meat, the meat-like processed food product containing a dough prepared from an oil-in-water emulsion gel containing methyl cellulose, securing a high yield during heating, and having a good meat-like texture.

Solution to Problem

The inventors conducted extensive studies in order to address the above problems, and as a result, found that, when insoluble dietary fibers and citrus fibers are used together, it is possible to improve a texture, particularly a meat-like texture, and improve the yield during heating, and completed the present invention.

Specifically, the present invention relates to:

(1) A method for manufacturing a meat-like processed food product, including the following steps:

(a) a step of preparing an oil-in-water emulsion containing at least an oil/fat, methyl cellulose and water;

(b) a step of preparing a dough by mixing the emulsion prepared in (a) with a textured vegetable material, insoluble dietary fibers and citrus fibers; and (c) a step of forming and then heating the dough prepared in (b) into a meat-like processed food product.

(2) The method for manufacturing a meat-like processed food product according to (1), which does not contain meat and egg white.

(3) The method for manufacturing a meat-like processed food product according to (2),
wherein the insoluble dietary fibers have an average fiber length of 20 to 300 μm.

(4) The method for manufacturing a meat-like processed food product according to (3),
wherein the insoluble dietary fibers are bamboo fibers.

(5) The method for manufacturing a meat-like processed food product according to (1),
wherein the insoluble dietary fibers have an average fiber length of 20 to 300 μm.

(6) The method for manufacturing a meat-like processed food product according to (5),
wherein the insoluble dietary fibers are bamboo fibers.

(7) The method for manufacturing a meat-like processed food product according to (1),
wherein the dough contains an oil-in-water emulsion gel containing methyl cellulose.

(8) The method for manufacturing a meat-like processed food product according to (7), which does not contain meat and egg white.

(9) The method for manufacturing a meat-like processed food product according to (8),
wherein the insoluble dietary fibers have an average fiber length of 20 to 300 μm.

(10) The method for manufacturing a meat-like processed food product according to (9),
wherein the insoluble dietary fibers are bamboo fibers.

(11) The method for manufacturing a meat-like processed food product according to (7),
wherein the insoluble dietary fibers have an average fiber length of 20 to 300 μm.

(12) The method for manufacturing a meat-like processed food product according to (11),
wherein the insoluble dietary fibers are bamboo fibers.

(13) A meat-like processed food product containing a textured vegetable material, methyl cellulose, insoluble dietary fibers and citrus fibers,
wherein a dough contains an oil-in-water emulsion gel containing methyl cellulose.

(14) The meat-like processed food product according to (13), which does not contain meat and egg white.

(15) The meat-like processed food product according to (14),
wherein the insoluble dietary fibers have an average fiber length of 20 to 300 μm.

(16) The meat-like processed food product according to (15),
wherein the insoluble dietary fibers are bamboo fibers.

Advantageous Effects of Invention

According to the present invention, it is possible to provide a meat-like processed food product having a good meat-like texture and an improved yield during heating with a reduced amount or none of egg white.

DESCRIPTION OF EMBODIMENTS (Meat-Like Processed Food Product)

The meat-like processed food product in the present invention is a product processed into a meat form mainly using a textured vegetable material. Examples of meat-like processed food products include hamburgers, patties, meatballs, nuggets, tsukune, ham, sausage, salami, frankfurter, corn dogs, gyoza, shao-mai, egg rolls, meat buns, xiaolongbao, minced meat cutlet, meat pie, cappelletti, lasagna, meat loaf, rolled cabbage, stuffed green pepper and other general food products in which various minced meats are commonly used.

(Oil-In-Water Emulsion)

In the present invention, an oil-in-water emulsion containing methyl cellulose and water is essential.

The methyl cellulose used in the present invention is made of cellulose as a raw material, which is naturally widely distributed, and is methoxylated, and thus it is usually manufactured by treating cellulose with caustic soda and then reacting with methyl chloride and an etherifying agent. In addition, it has a property of increasing gelling power reversibly by heating. In the present invention, methyl cellulose can be used alone or in combination with other gelling agents. Examples of other gelling agents include egg white, gellan gum, carrageenan, alginic acid, agar, curdlan, konjac powder, and starch.

In the emulsion of the present invention, various oils/fats can be used. Specifically, soybean oil, rapeseed oil, rice oil, corn oil, palm oil, beef tallow, lard, their fractionated oils, hydrogenated oils, and transesterified oils may be exemplified, and these can be appropriately selected and used. However, since the objective of the present invention is a meat-like processed food product, it is desirable to use an oil/fat in a melted state at the eating temperature or mouth temperature.

(Insoluble Dietary Fibers)

The insoluble dietary fibers used in the present invention are plant-derived fibers that do not dissolve in water or warm water. Specific examples thereof include bamboo fibers, oat fibers, and wheat fibers. Bamboo fibers are particularly preferable because they are not too dry and can impart an appropriate hardness. In addition, the average fiber length is preferably 20 to 300 μm and more preferably 30 to 200 μm. Here, the average fiber length can be obtained by measuring the fiber length of the dietary fibers using a scanning electron microscope. Specifically, 30 fibers in the field of view are randomly selected, and the average length of the fibers is used as the average fiber length.

When insoluble dietary fibers are added, a gel-like texture with methyl cellulose is improved, and a meat-like fibrous texture close to that of a general meat processed food product can be obtained. If the fiber length is in an appropriate range, the fibrous texture weakens and the crispness is improved, but if the fiber length is shorter than 20 μm, the meat-like texture becomes slightly weaker, and if the fiber length is more than 300 μm, a gel feeling is not reduced much, and the texture tends to be stiff.

(Citrus Fiber)

The citrus fibers used in the present invention are obtained by squeezing citrus fruits such as oranges and then removing juice from the squeezed liquid, and have a high impact on the cell wall after powdering. Therefore, the citrus fibers have a porous structure in which micelle structures of cells are broken, have a significantly improved water absorption capacity, and also have an improved binding ability with respect to water, and improve a water retention capacity of water that has been incorporated as a result. Specifically, the water absorption amount per fiber weight is 15 times or more, and preferably 18 times or more. Here, the water absorption amount is measured by adding 50 g of water to 1 g of each sample fiber, stirring the mixture in a 50 ml container, then leaving it for 24 hours, and checking the boundary between the supernatant and the precipitate. In addition, the above insoluble dietary fibers are those with less than 15 times and preferably 10 times or less this water absorption amount.

When citrus fibers are added, it is possible to prevent water release when a molded dough is heated, which is a problem when using methyl cellulose, and thus it is possible to maintain the meat-like texture and improve the yield.

(Textured Vegetable Material)

The textured vegetable material used in the present invention is a material having a directional water-insoluble structure, and is mainly divided into a textured vegetable protein material and a textured vegetable polysaccharide material.

Examples of textured vegetable protein materials include those obtained by processing vegetable raw materials such as soybeans, defatted soybeans, isolated soybean proteins, concentrated soybean proteins, wheat, wheat proteins, peas, pea proteins, chickpeas, and mycoproteins into a structured product shape. For example, in the case of soybeans, as necessary, soybeans, defatted soybeans, isolated soybean proteins or the like are combined with other raw materials, and structured at a high temperature and high pressure using a single-screw or twin-screw extruder (extruder) or the like to form a granular shape, a flake shape, or a sliced mea shape. The same processing is performed on peas, green beans, and chickpeas, round beans and their fractionated products as raw materials, and thus structured materials can be obtained.

In the present invention, a textured soybean protein material containing soybeans as a main raw material is suitable, and according to a desired product form, a product with an arbitrary shape and size can be appropriately selected and used. Here, although there are products that have been rehydrated and distributed, it is desirable to use a dried product (a water content of 10 wt % or less) in the present invention. In addition, a soybean material that is structured by squeezing tofu is also suitable for the present invention.

As the textured vegetable protein material, so-called gluten chips prepared by processing wheat proteins can also be used in the present invention.

On the other hand, regarding the textured vegetable polysaccharide material, a structured product obtained by partially insolubilizing polysaccharides by freezing polysaccharides, particularly konjac gel, can be used as a polysaccharide material.

In the present invention, the textured vegetable material can be used in combination with various shapes such as a flat shape and a grain shape. In addition, it is possible to use a combination of various textured vegetable materials.

A dough is prepared by adding a textured vegetable polysaccharide material, insoluble dietary fibers, and citrus fibers to the above emulsion. When this dough is heated, a textured vegetable material is bound with a gelling agent mainly composed of methyl cellulose, and thus a meat-like processed food product can be prepared. These meat-like processed food products have a texture similar to that of a meat processed food product using egg white.

(Step a) (Emulsion Preparation)

An oil/fat, methyl cellulose and water are mixed to prepare an oil-in-water emulsion. In this case, if a shear is applied using a mixer, a food processor, a silent cutter, a hand blender, a Stephan mixer or the like, this is preferable because emulsified particles are fine. When an oil/fat and methyl cellulose are mixed in advance, and sufficiently dispersed and water is then added, a better emulsion can be obtained.

The amount of oil/fat is preferably 10 to 40 wt % and more preferably 15 to 30 wt %. A certain amount of methyl cellulose is required to become a gel, and 2 to 8 wt % may be exemplified.

The amount of water varies depending on the amount of other additives, and is preferably 55 to 88 wt % and more preferably 55 to 83 wt %. In addition, since the solubility of methyl cellulose increases at a low temperature, the temperature of the water used is preferably low, and it is more preferable to use ice water. A method of performing freezing after the emulsion preparation is beneficial.

Other components such as sweeteners, spices, salts, flavor imparting materials, and seasonings other than the above examples can be added to the emulsion as long as the effects of the present invention are not impaired. This addition can be performed before and after the emulsification step.

(Step b) (Dough Preparation)

Insoluble dietary fibers, citrus fibers and a textured vegetable material are mixed with the emulsion produced in the step a to prepare a dough. A mixer, a food processor, a silent cutter or the like can be used for mixing. When the textured vegetable material is a textured vegetable protein material, it is generally a dried product, and in this case, first water is absorbed, "rehydration" in which the tissue softens is performed, and mixing is then performed, but adding and mixing of the dried textured vegetable protein material and water and adding and mixing of partially rehydrated textured vegetable protein material and water are acceptable. In addition, a part of the water can be used as the oil-in-water emulsion.

In order to change flavor and physical properties, it is possible to add various seasonings, vegetables, starches, gelling agents, egg white, and vegetable protein materials such as powdery soybean proteins. In addition, it is acceptable to add meat.

Regarding the amount of each component used, the amount of the emulsion in the dough is preferably 10 to 40 wt % and more preferably 20 to 30 wt %. The amount of insoluble dietary fibers is preferably 0.1 to 5 wt % and more preferably 0.5 to 3 wt %. The amount of citrus fibers is preferably 0.1 to 5 wt % and more preferably 0.5 to 3 wt %. The dry amount of the textured vegetable material is preferably 5 to 30 wt % and more preferably 8 to 20 wt %.

It is possible to use meat in place of the textured vegetable protein material, but the amount of meat as as is is preferably 25 wt % or less, and it is more preferable not to use it. Egg white can be added, but the amount of egg white as a dried product is preferably 5 wt % or less and it is more preferable not to use it.

(Step c) (Forming and Heating)

The dough produced in the step b is molded to have a desired size and shape using a molding machine. Next, the molded dough is subjected to a heating step. For the heating method in the present invention, appropriate combination of firing heating, steaming heating, boiling heating, frying heating, electromagnetic wave heating and the like can be used. In addition, retort heating is also possible. Accordingly, the molded dough is heated and solidified and the shape is stabilized.

The temperature and time depend on the shape, weight, and heating method, but the firing heating method may be performed at 180 to 300° C. for 5 to 15 minutes, the retort heating method may be performed at 115 to 130° C. for 10 to 60 minutes, and the steaming heating may be performed at 75 to 100° C. for 5 to 50 minutes.

According to the present invention, it is possible to obtain a meat-like processed food product having a texture similar to that of a general meat processed food product with a reduced amount or none of an animal raw material such as meat or egg white, and without lowering the yield during heating.

EXAMPLES

Hereinafter, the present invention will be described with reference to examples. The following parts are parts by weight.

Example 1

1.3 parts of methyl cellulose (MCE100TS, commercially available from Shin-Etsu Chemical Co., Ltd.) was added to 4.2 parts of rapeseed oil and stirred in a robot coupe, 16.6 parts of ice water was then added and the mixture was additionally stirred to obtain an oil-in-water emulsion A. With respect to a total amount of the emulsion A, 2.0 parts of bamboo fibers (BAF90/an average fiber length of 80 μm/a water absorption rate of 4.5, commercially available from Rettenmaier Co., Ltd.), and 2.0 parts of citrus fibers (Herbacel AQ Plus CF-D/100/a water absorption rate of 40, commercially available from DSP Gokyo Food & Chemical Co., Ltd.) were added and stirred with a mixer, and 2.5 parts of a textured soybean protein material B rehydrated with 10 parts of water (APEX 650/grain shape, commercially available from Fuji Oil Co., Ltd.), 7.5 parts of a textured soybean protein material C rehydrated with 18.8 parts of water (APEX 350/grain shape, commercially available from Fuji Oil Co., Ltd.), 3.0 parts of a textured soybean protein material D rehydrated with 7.5 parts of water (APEX 950/flat shape, commercially available from Fuji Oil Co., Ltd.), 5.0 parts of a vegetable oil/fat that is a solid at room temperature (Unishort MJ, commercially available from Fuji Oil Co., Ltd.), 8.6 parts of seasonings and spices, 10.0 parts of onions cut into 5 mm squares, and 2.0 parts of α-starch (Matsutani Pinesoft B, commercially available from Matsutani Chemical Industry Co., Ltd.) were then added, the mixture was stirred with a Kenwood mixer for 3 minutes to prepare a dough.

The dough was punched using an automatic molding machine (GM-D) (commercially available from Nippon Career Co., Ltd.) to form 70 g of a sample, and firing heating was performed using a convection oven (SCC WE 101, commercially available from Rational Japan Co. Ltd.) at 300° C. for 6 minutes to obtain a hamburger-like food product.

Example 2

A sample was prepared in the same manner as in Example 1 except that orange fibers (Citri-Fi 100FG/a water absorption rate of 20, commercially available from The Torigoe Co., Ltd.) were used in place of citrus fibers in the formulation of Example 1.

Comparative Example 1

A sample was prepared in the same manner as in Example 1 except that citrus fibers and bamboo fibers were removed from the formulation of Example 1.

Comparative Example 2

A sample was prepared in the same manner as in Example 1 except that citrus fibers were removed from the formulation of Example 1.

In the above Examples 1 and 2, and Comparative Example 1, each molded products was heated using a convection oven (SCC WE 101, commercially available from Rational Japan Co. Ltd.) at 90° C. for 12 minutes. In addition, each molded product was heated in a frying pan for about 6 minutes until the core temperature reached 80° C. In addition, each molded product was subjected to retort heating using RCS-40RTG (commercially available from Hisaka Works, Ltd.) at 121° C. for 30 minutes.

Comparative Example 3

A sample was prepared in the same manner as in Example 1 except that pea fibers (Pea EF150/a water absorption rate of 14, commercially available from Rettenmaier Co., Ltd.) were used in place of citrus fibers in the formulation of Example 1.

Comparative Example 4

A sample was prepared in the same manner as in Example 1 except that bamboo fibers were removed from the formulation of Example 1.

Example 3

A sample was prepared in the same manner as in Example 1 except that the bamboo fibers in the formulation of Example 1 were replaced with the same amount of sugar cane fibers (SF601, an average fiber length of 100 μm/a water absorption rate of 4.8, commercially available from JRS).

Example 4

A sample was prepared in the same manner as in Example 1 except that the bamboo fibers in the formulation of Example 1 were replaced with the same amount of wheat fibers (VITACEL WF200/an average fiber length of 250 μm/a water absorption rate of 7.5, commercially available from Rettenmaier Co., Ltd.).

TABLE 1

| | Formulation (parts) | Water absorption rate | Example 1 | Example 2 | Comparative Example 1 | Comparative Example 2 | Comparative Example 3 | Comparative Example 4 | Example 3 | Example 4 |
|---|---|---|---|---|---|---|---|---|---|---|
| | Compositions of respective test examples | | | | | | | | | |
| Emulsion A | methyl cellulose | 1.3 | ← | ← | ← | ← | ← | ← | ← | ← |
| | ice water | 16.6 | ← | ← | ← | ← | ← | ← | ← | ← |
| | rapeseed oil | 4.2 | ← | ← | ← | ← | ← | ← | ← | ← |
| Insoluble fibers | bamboo fibers BAF90 (80 μm) | 4.5 | 2.0 | 2.0 | | 2.0 | 2.0 | | | |
| | sugar cane fibers (100 μm) | 4.8 | | | | | | | 2.0 | |
| | wheat fibers (250 μm) | 7.5 | | | | | | | | 2.0 |
| Citrus fibers | citrus fibers (Herbacel AQ) | 40 | 2.0 | | | | | 2.0 | 2.0 | 2.0 |
| | citrus fibers (Citri-Fi 100FG) | 20 | | 2.0 | | | | | | |
| | pea fibers (Pea EF150) | 14 | | | | | 2.0 | | | |
| Granular soybean proteins | textured soybean protein material B | 2.5 | ← | ← | ← | ← | ← | ← | ← | ← |
| | restored water | 10.0 | ← | ← | ← | ← | ← | ← | ← | ← |
| | textured soybean protein material C | 7.5 | ← | ← | ← | ← | ← | ← | ← | ← |
| | restored water | 18.8 | ← | ← | ← | ← | ← | ← | ← | ← |
| | textured soybean protein material D | 3.0 | ← | ← | ← | ← | ← | ← | ← | ← |
| | restored water | 7.5 | ← | ← | ← | ← | ← | ← | ← | ← |
| | vegetable oil/fat | 5.0 | ← | ← | ← | ← | ← | ← | ← | ← |
| Other formulations | seasonings/spices | 8.6 | 8.6 | 8.6 | 8.6 | 8.6 | 8.6 | 8.6 | 8.6 | 8.6 |
| | onion | 10.0 | ← | ← | ← | ← | ← | ← | ← | ← |
| | α-starch | 2.0 | ← | ← | ← | ← | ← | ← | ← | ← |
| | sum | | 101.0 | 101.0 | 97.0 | 99.0 | 101.0 | 99.0 | 101.0 | 101.0 |

(Evaluation)

The weight of each molded dough was measured before and after heating, and the heating yield was calculated, and then expressed as a relative value when the yield of Comparative Example 1 was set to 100. In addition, sensory evaluation was performed based on the following criteria.

Sensory Evaluation Criteria)

Five skilled panelists performed sensory evaluation, comprehensively evaluated meat processed food products, particularly a hamburger-like texture, and made determination by discussion.

A: particularly good, comparable to meat hamburger,

B: good as a hamburger-like food product without problems

C: slightly inferior, but within the range of a hamburger-like food product

D: unsuitable, did not feel like a hamburger-like food product

2. The method for manufacturing the meat-like processed food product according to claim 1, wherein the meat-like processed food product does not contain meat and egg white.

3. The method for manufacturing the meat-like processed food product according to claim 2,
wherein the insoluble dietary fibers have an average fiber length of 20 to 300 μm.

4. The method for manufacturing the meat-like processed food product according to claim 1,
wherein the insoluble dietary fibers have an average fiber length of 20 to 300 μm.

5. The method for manufacturing the meat-like processed food product according to claim 1,
wherein the dough contains an oil-in-water emulsion gel containing methyl cellulose.

6. The method for manufacturing the meat-like processed food product according to claim 5, wherein the meat-like processed food product does not contain meat and egg white.

TABLE 2

| | | | | | | | | | |
|---|---|---|---|---|---|---|---|---|---|
| Yield and function evaluation of respective test examples | | | | | | | | | |
| | Formulation (parts) | Example 1 | Example 2 | Comparative Example 1 | Comparative Example 2 | Comparative Example 3 | Comparative Example 4 | Example 3 | Example 4 |
| Yield based on 100% of "Comparative Example 1" | 300° C. × 6 minutes | 108 | 112 | (100) | 102 | 105 | 107 | 110 | 114 |
| | 90° C. × 12 minutes | 111 | 116 | (100) | 102 | | | | |
| | frying pan (core temperature of 80° C., about 6 minutes) | 109 | 111 | (100) | 101 | | | | |
| | retort heating 121° C. × 30 minutes | 110 | 109 | (100) | 104 | | | | |
| Sensory evaluation | comprehensive evaluation | A | B | D | D | D | D | B | C |
| | state | | | water release | water release | water release, stickiness | insufficient meat-like texture | | slightly insufficient meat-like texture |

Table 2 shows the formulations and evaluation results. Although the texture varied depending on the formulation, it can be said that all examples had a texture similar to that of the meat processed food product. On the other hand, comparative examples were unsuitable because they had problems such as "stickiness," insufficient meat-like texture, a large amount of water release, and a low yield during heating.

INDUSTRIAL APPLICABILITY

When the present invention is used, it is possible to manufacture meat-like processed food products using almost no animal raw materials.

What is claimed is:

1. A method for manufacturing a meat-like processed food product, comprising steps as follows:
(a) a step of preparing an oil-in-water emulsion consisting essentially of at least an oil/fat, methyl cellulose and water;
(b) a step of preparing a dough by mixing the emulsion prepared in (a) with a textured vegetable material, insoluble dietary fibers and citrus fibers; and
(c) a step of forming and then heating the dough prepared in (b) into a meat-like processed food product,
wherein the insoluble dietary fibers are selected from the group consisting of bamboo fibers and sugar cane fibers.

7. The method for manufacturing the meat-like processed food product according to claim 6,
wherein the insoluble dietary fibers have an average fiber length of 20 to 300 μm.

8. The method for manufacturing the meat-like processed food product according to claim 5,
wherein the insoluble dietary fibers have an average fiber length of 20 to 300 μm.

9. A meat-like processed food product produced by the method for manufacturing a meat-like processed food product of claim 1, the meat-like processed food product containing the textured vegetable material, methyl cellulose, insoluble dietary fibers and citrus fibers,
wherein the dough contains an oil-in-water emulsion gel containing methyl cellulose, and
the insoluble dietary fibers are selected from the group consisting of bamboo fibers and sugar cane fibers.

10. The meat-like processed food product according to claim 9, wherein the meat-like processed food product does not contain meat and egg white.

11. The meat-like processed food product according to claim 10,
wherein the insoluble dietary fibers have an average fiber length of 20 to 300 μm.

* * * * *